(No Model.)
J. C. BUTTERFIELD.
LOCK NUT.
No. 290,849. Patented Dec. 25, 1883.
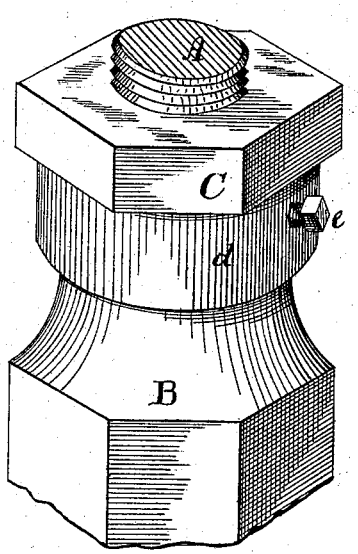
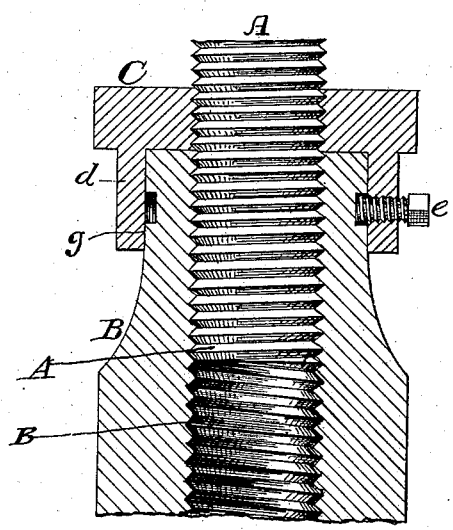
Witnesses:
J. E. Turner
N. B. Smith
Inventor:
John C Butterfield
By his atty
R. D. Smith

UNITED STATES PATENT OFFICE.

JOHN C. BUTTERFIELD, OF CHICAGO, ILLINOIS.

LOCK-NUT.

SPECIFICATION forming part of Letters Patent No. 290,849, dated December 25, 1883.

Application filed September 7, 1883. (No model.)

*To all whom it may concern:*

Be it known that I, JOHN C. BUTTERFIELD, of Chicago, in the county of Cook and State of Illinois, have invented a new and useful Improvement in Nut-Locks; and I do hereby declare that the following is an accurate description of the same.

My invention relates to that class of nut-locks wherein two nuts are run upon the same thread, the one being screwed hard upon the other, so that by their mutual pressure upon the screw-thread sufficient friction may be caused to enable them to resist the disturbing influences incident to the use of the particular machine. Experience has demonstrated, however, that no practicable amount of frictional pressure will long resist the disturbing action of continued or oft-repeated vibrations, which act upon the nuts independently and separates them, and that this disturbing action is facilitated by fluctuations in temperature. Numerous devices have therefore been proposed to afford a positive lock to the jam-nut, and among these I am aware it has been proposed to couple the two nuts together after being screwed to place, so that the frictional resistance may be maintained by rendering it impossible for one of said nuts to move independently of the other. My invention belongs to this latter variety.

So far as I am aware, devices for locking the two nuts together have, in general terms, consisted either of some form of key, which could only act in stated positions, or in a secondary set-screw inserted through one nut parallel with its axis and bearing upon the other, thereby tending to crowd them apart and strain the threads.

My invention is an improvement upon this latter method; and it consists in providing the secondary or jam nut with a sleeve, which projects forward over a part of the primary or principal nut, and a set-screw inserted through said sleeve in a line transverse to the axis of the nut, so as to lock said nuts together independent of the threads of the main screw, and so that said primary and secondary nuts may be locked together and moved as one nut, or may be jammed in the usual way and thus locked, so that they cannot be independently loosened.

That others may fully understand my improvement, I will particularly describe it, having reference to the accompanying drawings, wherein—

Figure 1 is a perspective view, showing how I have applied my invention to the adjustable piston-rod of my atmospheric hammer and stamp-mill. Fig. 2 is a vertical central section of the same.

In describing my invention as I have applied it to this particular machine, I do not design to confine myself to the use of it in said machine; but I propose to use it wherever a compound or jam nut constructed as above set out may be applicable.

A is the principal screw, upon which the primary nut B is placed and fitted to traverse in the usual way. C is the secondary or jam nut, also fitted to traverse the screw A and screw up hard against the nut B. The nut C is provided with a sleeve-flange, *d*, which, when the two nuts are brought together, will extend over and inclose the end of nut B, as shown; and a set-screw, *e*, is inserted through said flange-sleeve in a direction radial to the axis of the screw A, so that it may be caused to engage the outer and inclosed surface of the nut B, and thereby lock said nuts B and C firmly to each other independent of the presence of the screw A. For convenience, I prefer to form a shallow groove, *g*, in the nut B, to receive the end of the screw *e*. Therefore, when the nuts are to be moved, the screw *e* is loosened, and the nut C is turned backward until the pressure of contact has been relieved, and the screw *e* may then be again tightened. Thereafter the two nuts may be moved forward and backward as one nut until the primary nut is in the desired position, when the secondary nut, being first liberated, may be screwed up hard against its primary, and fastened there by the screw *e*.

Having described my invention, what I claim as new is—

1. A principal screw, A, and a nut, B, adapted to traverse thereon, combined with a secondary or jam nut, C, provided with a sleeve-flange, *d*, and set-screw *e*, substantially as and for the purpose set forth.

2. The screw A and primary nut B, provided with a groove, *g*, combined with a secondary nut, C, provided with a sleeve-flange, *d*, and a set-screw, *e*, adapted to engage the nut B in the groove *g*, substantially as and for the purpose set forth.

JOHN C. BUTTERFIELD.

Witnesses:
C. A. POMEROY,
J. W. LAKE.